United States Patent
Hasebe et al.

[11] Patent Number: 5,889,342
[45] Date of Patent: Mar. 30, 1999

[54] MOTOR COOLING CIRCUIT

[75] Inventors: Masahiro Hasebe, Anjo; Yasuo Yamaguchi, Hekinan, both of Japan

[73] Assignee: Aisin AW Co., Ltd., Japan

[21] Appl. No.: 770,630

[22] Filed: Dec. 19, 1996

[30] Foreign Application Priority Data

Dec. 21, 1995 [JP] Japan .................................. 7-349012

[51] Int. Cl.⁶ .................................................. H02K 9/00
[52] U.S. Cl. .................. 310/54; 310/52; 310/58; 310/59; 310/60 A; 310/156; 310/261; 310/268
[58] Field of Search ................. 310/52, 54, 58, 310/59, 60 A; 417/366

[56] References Cited

U.S. PATENT DOCUMENTS

| | | | |
|---|---|---|---|
| 4,435,662 | 3/1984 | Tawse | 310/168 |
| 4,644,202 | 2/1987 | Kroy et al. | 310/58 |
| 5,019,733 | 5/1991 | Kano et al. | 310/61 |
| 5,034,638 | 7/1991 | McCabria | 310/54 |
| 5,181,837 | 1/1993 | Niemiec | 417/350 |
| 5,219,277 | 6/1993 | Tuckey | 417/366 |
| 5,283,488 | 2/1994 | Ponnappan et al. | 310/55 |
| 5,372,213 | 12/1994 | Hasebe et al. | 180/65.6 |

FOREIGN PATENT DOCUMENTS

| | | | |
|---|---|---|---|
| 4320559-A1 | 12/1994 | Germany | 310/54 |
| 0129763 | 5/1989 | Japan | 310/54 |
| 5122903 | 5/1993 | Japan | 310/54 |
| 405236704A | 9/1993 | Japan | 310/54 |

*Primary Examiner*—Nestor Ramirez
*Assistant Examiner*—Elvin G. Enad
*Attorney, Agent, or Firm*—Lorusso & Loud

[57] ABSTRACT

A cooling circuit for a motor which includes a rotor having a rotor shaft, and a core fitted on the rotor shaft and carrying a plurality of permanent magnets arranged on its outer circumference. A stator is arranged radially outward of the rotor. The motor cooling circuit includes axially extending oil passages formed in the rotor core radially inward of the permanent magnets.

12 Claims, 5 Drawing Sheets

FIG. 5 ced on the

MOTOR COOLING CIRCUIT

BACKGROUND OF THE INVENTION

1. Field of the Invention

The present invention relates to an electric motor and, more particularly, to prevention of irreversible demagnetization which might otherwise result from overheating of the permanent magnets of the rotor.

2. Related Art

One system for cooling a DC brushless motor having permanent magnets arranged around the outer circumference of its rotor directs lubrication oil circulated through the motor onto the coil ends of a stator from an oil passage chamber in the upper portion of a motor case, through oil holes, as disclosed in Japanese Patent Laid-Open No. 122903/1993. In this cooling system, mainly the coil of the stator is cooled to prevent an increase in the electric resistance of the coil, which would change the motor characteristics, as might otherwise result from overheating with feed of a high current.

Permanent magnets arranged around the outer circumference of the rotor are susceptible to becoming irreversibly demagnetized should their temperature rise. In this respect, the oil feed stream from the upper portion of the motor case in the aforementioned prior art can be expected to splash onto the non-rotational parts including the stator. However, in this motor it is difficult to feed the oil to the rotor because the centrifugal force resulting from the rotation of the rotor tends to throw off the oil.

SUMMARY OF THE INVENTION

It is, therefore, a first object of the present invention to provide a motor cooling circuit for preventing irreversible demagnetization, which might otherwise be caused by heat, by cooling the permanent magnets arranged on the rotor.

A second object of the present invention is to provide a motor cooling circuit which is able, not only to prevent irreversible demagnetization of the permanent magnets arranged on the rotor due to heat, but also to protect the coil against an increase in the electric resistance by cooling the coil ends of the stator.

A third object of the present invention is to provide a motor cooling circuit which is able, not only to suppress the irreversible demagnetization by evenly cooling the permanent magnets arranged on the rotor, but also to protect the coil against an increase in electric resistance by likewise uniformly cooling the coil ends of the stator.

A fourth object of the present invention is to improve the efficiency of cooling of the individual permanent magnets with the oil while achieving the above-specified objects.

A fifth object of the present invention is to provide an in-core oil passage with an effective heat exchange area sufficient to achieve the aforementioned fourth object.

A sixth object of the present invention is to provide a cooling circuit which can achieve the aforementioned objects for a rotor having a core fabricated of common steel sheets.

In order to achieve the above-specified objects, the present invention provides a cooling system for a motor wherein the rotor is formed of a rotor shaft and a core mounted on the rotor shaft and having a plurality of permanent magnets arranged around its outer circumference. A stator is arranged radially outward of the rotor. The motor cooling system of the present invention includes a cooling circuit with axially extending oil passages formed in the rotor core, radially inward of the permanent magnets, and feed means for feeding oil to the axial oil passages.

More specifically, the present invention provides a motor including a rotor formed of a rotor shaft, a core fitted on the rotor shaft and a plurality of permanent magnets circumferentially spaced around the outer circumference of the core. The rotor has first and second end plates arranged at the two axial ends of its core for axially positioning the plurality of permanent magnets. A stator is arranged radially outward of the rotor and includes a core and a coil with coil ends extending from the axial ends of the core. The motor cooling circuit includes an axial oil passage formed in the rotor shaft, and radial oil passages also formed in the rotor shaft in communication with the axial oil passage. Axially extending oil passages are formed in the core of the rotor radially inward of the permanent magnets. Oil passages are formed in the end plates of the rotor provide communication between the radial oil passages of the rotor shaft and the axially extending oil passages of the rotor core. Oil holes formed through the end plates open radially inward of the coil ends of the stator for distributing oil onto those core ends.

In a preferred embodiment, a first rotor end plate has a radially extending first oil passage for providing communication between a first radial oil passage of the rotor shaft and a first axially extending oil passage in the rotor core and a first oil hole communicating with a second axially extending oil passage in the rotor core and opening radially inward of a first coil end of the stator. A second rotor end plate has a radially extending second oil passage for providing communication between a second radial oil passage in the rotor shaft and the second axially extending oil passage in the rotor core, and a second oil hole communicating with the first axially extending oil passage in the rotor core and opening radially inward of the second coil end of the stator.

In a preferred configuration, the oil passages which extend axially through the rotor core, in radial cross-section, each present an upper surface approximately parallel to and coextensive with one of the permanent magnets.

The cooling oil is fed from the feed means of the cooling circuit to the axial oil passage of the rotor shaft and, by way of the radial oil passages of the rotor shaft, to the radial oil passages in the rotor end plates, through axial oil passages in the rotor core and out through oil holes of the rotor end plates. In this manner, the permanent magnets can be reliably cooled by the oil flowing through the axial oil passages of the core to prevent irreversible demagnetization due to heat. After so cooling the permanent magnets, the oil is fed by centrifugal force onto the coil ends of the stator to reliably cool the coil ends and to thereby protect the enamel, varnish and insulating paper of the coil from heat and prevent an increase in the electric resistance of the coil.

No cooling oil passage other than the aforementioned axially extending oil passages need be formed in the core. Because the rotor core is formed as a laminate of a plurality of steel sheets, the fabrication of the rotor is simplified. Since all oil passages are of the same constant shape and size, all steel sheets of the rotor core can be made identical to reduce the number of kinds of the parts.

DESCRIPTION OF THE PREFERRED EMBODIMENT

An embodiment of the present invention will now be described with reference to the accompanying drawings, which embodiment is suitable for use as a drive unit for an electric car.

Figure 1:
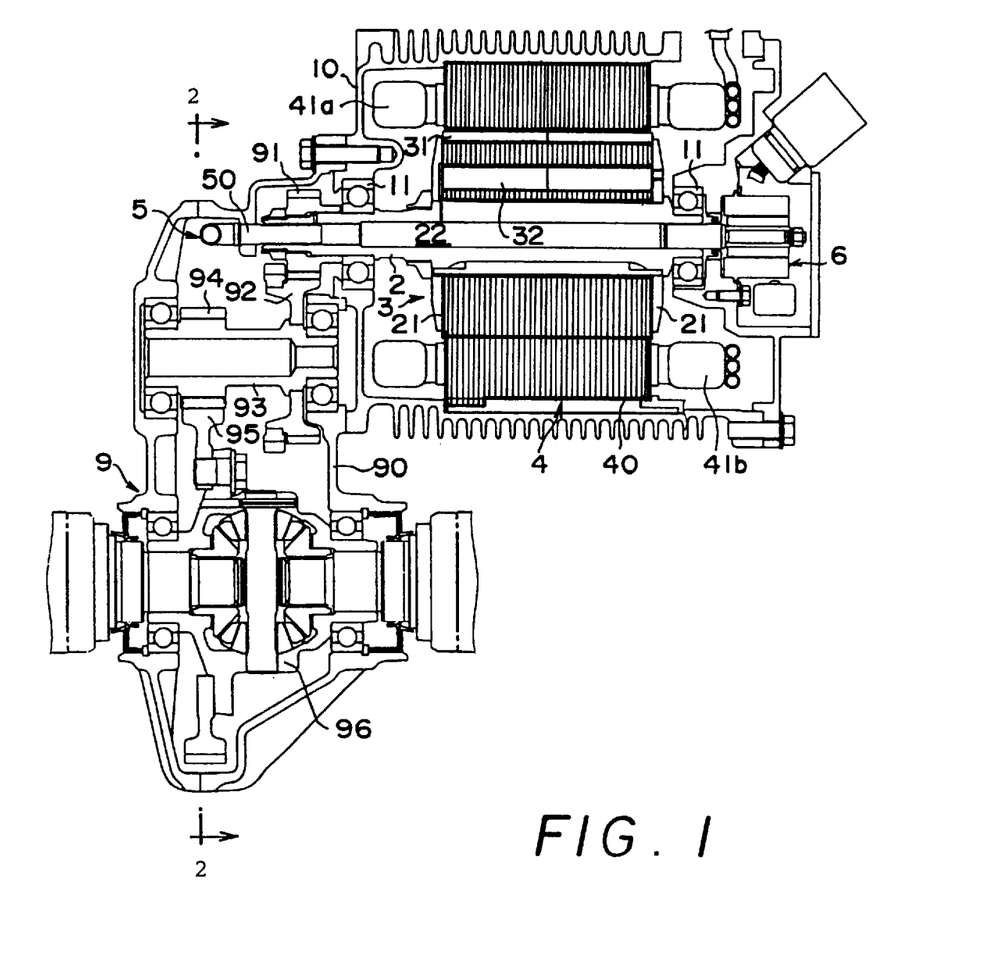
FIG. 1 is an axial sectional view of a motor according to one embodiment of the present invention.

As shown in an axial section in FIG. 1, the motor includes a rotor shaft 2 rotatably supported at its two ends by motor case 10 through bearings 11 and a rotor 3 fixed on the rotor shaft 2. As further shown in FIG. 4, the rotor has a plurality (six in the present embodiment) of permanent magnets 31 corresponding in number to the number of poles (i.e., six poles in the present embodiment). The permanent magnets 31 are arranged at the same pitch angle, i.e. at equal circumferential intervals. The core 30 of rotor 3 is fabricated of a laminated multiplicity of electromagnetic steel sheets 30. Stator 4 includes a stator core 40 secured against rotation with its outer circumference fixed to the motor case 10, is arranged radially outward of the rotor 3, and is made of a laminated multiplicity of electromagnetic steel sheets. Stator 4 further includes a coil portion inserted through a slot in the core 40 and having first and second coil ends 41a and 41b extending from the two axial ends of the core 40. A resolver 1 (FIG. 1) is fixed at one end of the rotor shaft 2 for detecting the magnetic pole position from the rotation of the rotor shaft 2.

The motor thus constructed may be used by joining its motor case 10 to a gear case 90 united with a differential unit 9 to provide an electric car drive unit. A gear 91, fixed on one end of the rotor shaft 2, is meshed with a larger-diameter gear 92 mounted on a counter shaft 93. The motor torque is further transferred through the smaller-diameter gear 94, also mounted on counter shaft 93, to a differential large gear 95 and, in turn, to differential case 96. The differential unit 9 is connected through a universal joint to the left and right wheel axles.

Figure 3:
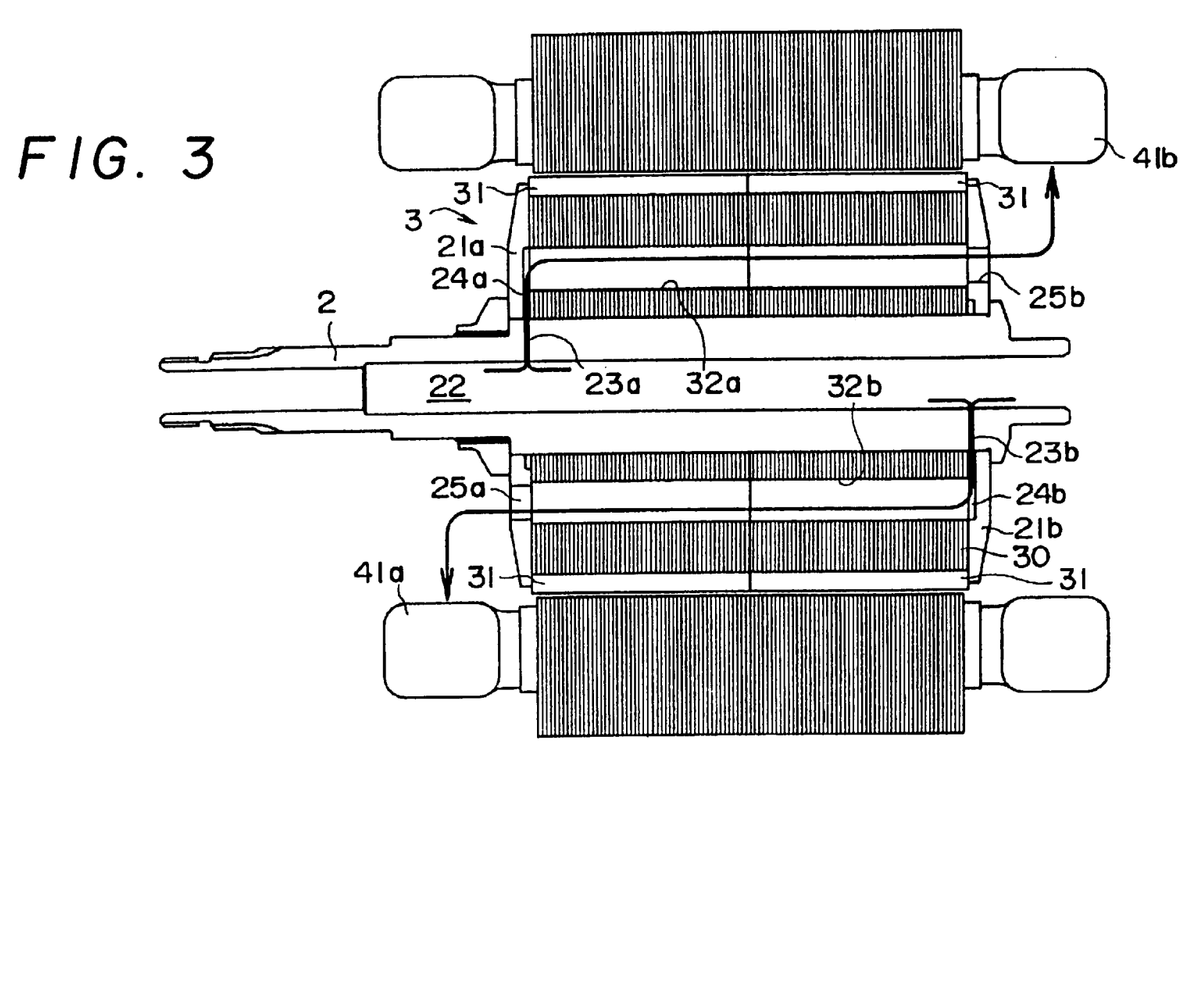
FIG. 3 is an axial sectional view showing the cooling circuit oil passages, with the stator and rotor of the motor removed.

As shown in detail in FIG. 3, the rotor 3 has first and second plates 21a and 21b which are arranged at the two axial ends of its core 30 for axially positioning the plural permanent magnets 31. Both of these plates are absolutely identical in shape, having three grooves 24 formed in their one face which, when brought into abutment against the end faces of the core 30, form radial oil passages. These grooves 24 are connected to one another through an inner circumferential groove 24', are spaced at equal intervals (120 degrees in the present embodiment) and extend radially to terminations at positions corresponding to the ends of axial oil passages through the rotor 3. Further, three oil holes 25 are formed in the plate 21. These oil holes are arranged at the same radial distance from the central axis as the terminal end portions of the aforementioned individual grooves 24, are centered between the individual grooves 24 at equal intervals (120 degrees in the present embodiment) and extend completely through the thickness of the plate 21.

Reverting to FIG. 3, the cooling circuit for the motor includes an axial oil passage 22 formed in the rotor shaft 2, and first and second radial oil passages 23a and 23b in the rotor shaft 2 communicating with the axial oil passage 22. First and second axial oil passages 32a and 32b are formed through the core 30 and axially extend radially inward of the permanent magnets 31. A first radial plate oil passage 24a formed in the first plate 21a is aligned for communication with the first radial oil passage 23a of the rotor shaft 2 and with the first axial oil passage 32a of the core 30. Oil hole 25a is aligned for communication with the second axial oil passage 32b of the core 30 and opens radially inward of the first coil end 41a of the stator 4. A second plate oil passage 24b, formed in the second plate 21b, provides oil flow communication between the second radial oil passage 23b of the rotor shaft 2 and the second axial oil passage 32b in the core 30. A second oil hole 25b is aligned with the first axial oil passage 32a and opens radially inward of the second coil end 41b of the stator 4. FIG. 1 shows a feed means 5 for feeding the oil to the axial oil passage 22 of the rotor shaft 2.

Figure 4:
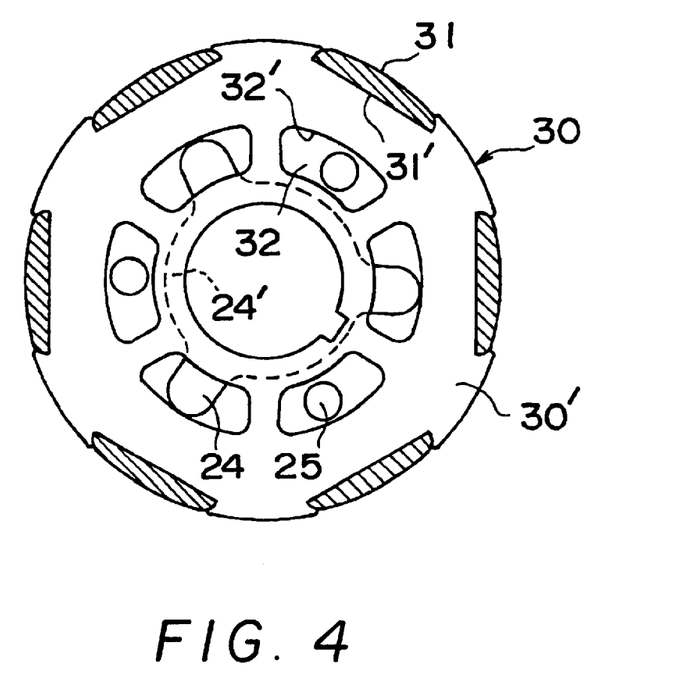
FIG. 4 is a transverse sectional view of a rotor core and shows the positional relationship between the rotor end plate of the motor.
Figure 5:
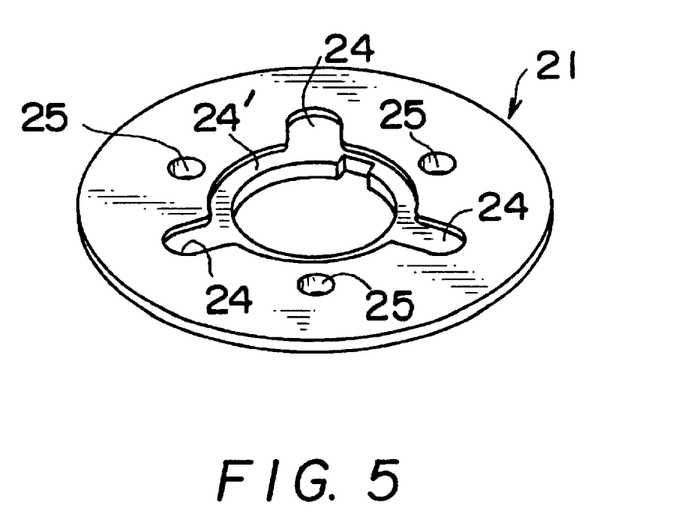
FIG. 5 is a perspective view showing the detail of the rotor end plate.

As shown in FIG. 4, the axial oil passages 32 in the core 30 are formed radially inward of the individual permanent magnets 31 and define circumferential surfaces 32' which are substantially equal in width to and extend in parallel with the inner faces 31' of the permanent magnets 31.

The core 30 of the rotor 3 is constructed as a laminate of a plurality of steel sheets 30' of an identical shape extending in series in the axial direction.

As shown in FIG. 1, the feed means 5 of the cooling circuit is constructed, in this embodiment, of an oil feed pipe 50 which is inserted into one end of the axial oil passage 22 of the rotor shaft 2 from the side of the gear case 90 connected to the motor case 10. The oil feed pipe 50 is equipped at its one end with an oil collecting gutter 51, as seen from the side of the gear case 90 in FIG. 2. As further seen in FIG. 2, this oil collecting gutter 51 is positioned to cross the outer circumferential portion of the differential large gear 95, mounted in the gear case 90, to collect the oil scooped up by the rotation of the differential large gear 95, at the level of the rotor shaft 2. The motor case 10 and the gear case 90 communicate with each other through an opening 52, the lower edge of which functions as a weir to hold the oil level in the motor case 10 at the level of the outer circumference of the rotor 3 indicated by dotted line 3. The two cases 10 and 90 also communicate through an orifice 53 which is formed below the opening 52 to balance the oil levels of the two cases.

Figure 2:
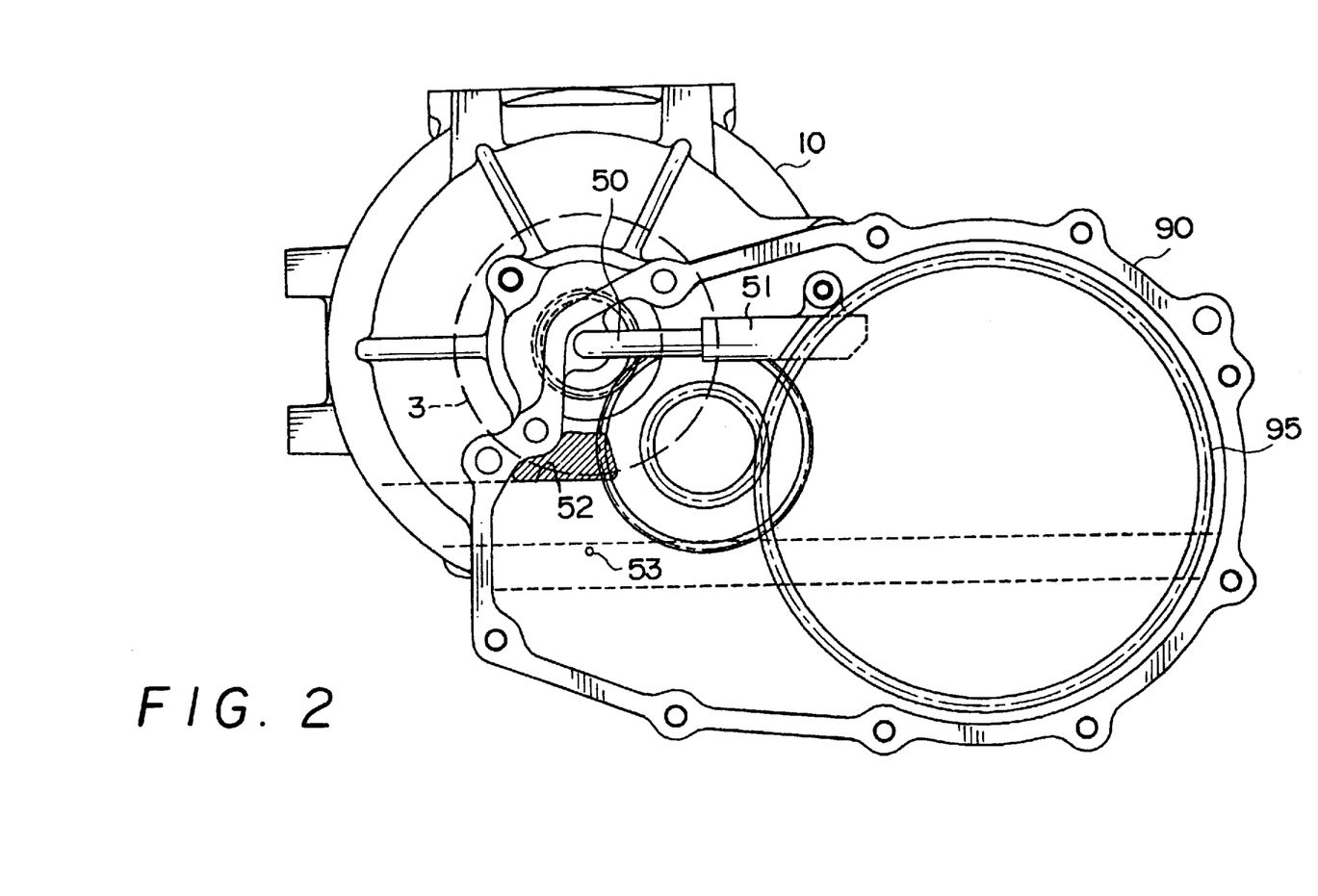
FIG. 2 is a view taken in the direction of arrows A—A in FIG. 1.

In the above-described cooling circuit for the motor, the lubricating and cooling oil is reserved mainly in the gear case 90 at the level indicated by a middle dotted line in FIG. 2. When the motor is started to run, the differential large gear 95 is driven by the motor to rotate counter-clockwise, as seen in FIG. 2, so that the oil, as scooped up by the gear 95, is collected by the oil collecting gutter 51. The collected oil is guided into the oil feed pipe 50 so that it is fed from the side of the gear case 90 to the inside of the axial oil passage 22 of the rotor shaft 2.

The flow of the oil on the motor side in the motor cooling circuit thus constructed is indicated by arrows in FIG. 3. The oil, fed to the axial oil passage 22 of the rotor shaft 2 as described above, is urged along the interior surface of the axial oil passage 22 by centrifugal force generated by the rotation of the rotor shaft 2. On one hand, as seen in FIG. 3, this oil enters the shaft radial oil passage 23a and flows through the first radial oil passage 24a of the plate 21a and the first axial oil passage 32a of the core 30 so that it is ejected from the second oil hole 25b of the plate 21b onto one coil end 41b by the centrifugal force of the rotor 3. On the other hand, oil also flows through the second radial oil passage 23b, the second radial oil passage 24b of the plate 21b and the second axial oil passage 32b of the core 30 so that it is ejects from the first oil hole 25a of the plate 21a onto the other coil end 41a by the centrifugal force of the rotor 3. As a result, the oil reliably cools the permanent magnets 31 in its one-way flow through the first and second axial oil passages 32a and 32b of the core 30, to thereby prevent their irreversible demagnetization due to heat and, further, is released from the first and second oil holes 25a and 25b so that it is reliably fed onto and cools the coil ends 41a and 41b at the opposite ends of the stator 4.

The oil thus having cooled the motor flows into the motor case 10 or drips from the individual portions so that it gathers in the lower portion of the motor case 10 until it overflows the lower level of the opening 52 and returns to the gear case 90. In running of the motor, the flow of oil through the aforementioned individual oil passages and so on drops the oil level in the gear case 90 to the lowermost level, as indicated by the lowest dotted line in FIG. 2, whereas the oil level in the motor case is kept at the level of the uppermost dotted line. When the motor is stopped, those two oil levels are gradually balanced and come together at the level of the middle dotted line by oil flow through the orifice 53.

In this cooling circuit, as has been described in detail, in order to cool the coil at the side of the stator 4 and, at the same time, cool the permanent magnets 31 at the side of the rotor 3 the oil, as introduced into the axial oil passage 22 of the rotor shaft 2, is guided through the radial oil passages 23a and 23b of the rotor shaft 2 and through the radial oil passages 24 of the plates 21, arranged at the opposite ends of the rotor core 30, and into the core 30. The axial oil passages 32 in the core 30 are positioned radially inward of the permanent magnets 31 constituting the individual magnetic poles and are in the same circumferential positions as the individual permanent magnets 31 so that the oil cools the permanent magnets 31 from their inner sides. This oil leaves the plates 21 at the opposing ends of the core 30 and is thrown onto the inner sides of the coil ends 41 by the centrifugal force generated by rotation of rotor 3. Six axial cooling oil passages are provided in the core 30, one for each of the six magnetic poles as shown in FIG. 4. Thus, three alternate axial oil passages are fed with the oil from one plate 21 and discharge oil at the opposite end of the core, through the other plate 21. As a result, the oil flows one way only through each axial oil passage 32, with flows in two adjacent passages 32 being in opposite directions, to maintain a constant flow which is finally guided onto the two coil ends 41. Moreover, the parts composing the oil passages can be made in common by making the plates 21 at the opposite ends of the core absolutely the same shape and by making the individual steel sheets 30' composing the core 30 absolutely the same shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electric motor comprising:
    a rotor including a rotor shaft rotatable about a central axis, a core mounted on said rotor shaft and defining an outer circumferential surface and a plurality of spaced permanent magnets mounted on said outer circumferential surface of said core;
    a stator surrounding and arranged radially outward of said rotor; and
    a motor cooling circuit including:
        a plurality of axial oil passages equal in number to said permanent magnets and formed in said core extending in parallel with said central axis, radially inward of said permanent magnets and arranged in a circle centered on said central axis, each of said permanent magnets being radially aligned with an individual one of said axial oil passages; and
        feed means for feeding oil to said axial oil passages.
2. An electric motor according to claim 1, wherein said axial oil passages, in radial cross-section, each have an upper surface approximately parallel to and circumferentially coextensive with one of said permanent magnets.
3. An electric motor comprising:
    a rotor including a rotor shaft rotatable about a central axis, a rotor core mounted on said rotor shaft and defining an outer circumferential surface and first and second plates arranged at axially opposed ends of said rotor core;
    a stator surrounding and arranged radially outward of said rotor, said stator including a stator core and a coil arranged within said stator core with coil ends extending from axially opposed ends of said stator core,
    a motor cooling circuit comprising:
        a shaft axial oil passage formed in said rotor shaft, and shaft radial oil passages formed in said rotor shaft in communication with said shaft axial oil passage;
        rotor axial oil passages formed in said rotor core extending parallel to said central axis, radially inward of said outer circumferential surface;
        plate oil passages formed in said first and second plates for providing communication between said shaft radial oil passages and said rotor axial oil passages at a first plurality of ends of said rotor axial oil passages closed by said first and second plates;
        oil holes formed in said second plate in communication with said rotor axial oil passages at a second plurality of ends of said rotor axial oil passages and opening radially inward of said coil ends of said stator for supplying oil onto said coil ends responsive to rotation of said rotor; and
    feed means for feeding oil to said shaft axial oil passage.
4. An electric motor according to claim 3, wherein said rotor core is made of a plurality of steel sheets laminated together.
5. An electric motor according to claim 3 further comprising:
    a plurality of spaced permanent magnets mounted on or in said rotor core.
6. An electric motor according to claim 3, wherein said axial oil passages are each radially aligned with an individual one of said permanent magnets.
7. An electric motor according to claim 6, wherein said rotor axial oil passages, in radial cross-section, each have an upper surface approximately parallel to and circumferentially coextensive with one of said permanent magnets.
8. An electric motor comprising:
    a rotor including a rotor shaft rotatable about a central axis, a rotor core mounted on said rotor shaft and defining an outer circumferential surface and first and second plates arranged at axially opposed ends of said rotor core;

a stator surrounding and arranged radially outward of said rotor, said stator including a stator core and a coil arranged within said stator core with first and second coil ends extending from opposing axial ends of said core, a motor cooling circuit comprising:

a shaft axial oil passage formed in said rotor shaft, and first and second shaft radial oil passages formed in said rotor shaft in communication with said shaft axial oil passage;

first and second rotor axial oil passages formed in said rotor core and extending parallel to said central axis radially inward of said outer circumferential surface;

a first plate oil passage formed in said first plate in communication with said first shaft radial oil passage and with said first rotor axial oil passage and a first oil hole in said first plate in communication with said second rotor axial oil passage, said first oil hole opening radially inward of the first coil end of said stator for supplying oil onto said first coil end, responsive to rotation of said rotor;

a second plate oil passage formed in said second plate in communication with said second shaft radial oil passage and with said second rotor axial oil passage and a second oil hole in said second plate in communication with said first rotor axial oil passage, said second oil hole opening radially inward of said second coil end of said stator for supplying oil onto said second coil end, responsive to rotation of said rotor; and feed means for feeding oil to said shaft axial oil passage.

9. An electric motor according to claim 8, wherein said rotor core is made of a plurality of steel sheets laminated together.

10. An electric motor according to claim 8 further comprising:

a plurality of spaced permanent magnets mounted on or in said rotor core.

11. An electric motor according to claim 10, wherein said axial oil passages are each radially aligned with an individual one of said permanent magnets.

12. An electric motor according to claim 11, wherein said rotor axial oil passages, in radial cross-section, each have an upper surface approximately parallel to and circumferentially coextensive with one of said permanent magnets.

* * * * *

UNITED STATES PATENT AND TRADEMARK OFFICE
CERTIFICATE OF CORRECTION

PATENT NO. : 5,889,342
DATED : March 30, 1999
INVENTOR(S) : HASEBE et al

It is certified that error appears in the above-indentified patent and that said Letters Patent is hereby corrected as shown below:

Col. 6, line 55, delete "3" and insert --5--.

Signed and Sealed this

Thirteenth Day of June, 2000

Attest:

Q. TODD DICKINSON

*Attesting Officer*     *Director of Patents and Trademarks*